United States Patent
Enenkel et al.

(10) Patent No.: US 6,842,765 B2
(45) Date of Patent: Jan. 11, 2005

(54) PROCESSOR DESIGN FOR EXTENDED-PRECISION ARITHMETIC

(75) Inventors: Robert F. Enenkel, Don Mills (CA); Fred G. Gustavson, Briar Cliff Manor, NY (US); Bruce M. Fleischer, Bedford Hills, NY (US); Jose E. Moreira, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 09/918,814

(22) Filed: Jul. 31, 2001

(65) Prior Publication Data

US 2002/0107900 A1 Aug. 8, 2002

(30) Foreign Application Priority Data

Dec. 8, 2000 (CA) ............................................ 2327924

(51) Int. Cl.$^7$ ................................................ G06F 7/38
(52) U.S. Cl. ........................................ 708/501; 708/495
(58) Field of Search ............................... 708/500–523, 708/495, 496, 209

(56) References Cited

U.S. PATENT DOCUMENTS

| | | | | |
|---|---|---|---|---|
| 5,329,283 A | * | 7/1994 | Smith ........................ | 708/521 |
| 5,341,321 A | * | 8/1994 | Karp et al. .................. | 708/500 |
| 5,515,308 A | * | 5/1996 | Karp et al. .................. | 708/500 |
| 5,631,859 A | * | 5/1997 | Markstein et al. .......... | 708/513 |
| 5,659,495 A | * | 8/1997 | Briggs et al. ............... | 708/523 |
| 5,880,984 A | * | 3/1999 | Burchfiel et al. ........... | 708/501 |
| 6,282,557 B1 | * | 8/2001 | Dhong et al. ............... | 708/523 |
| 6,529,924 B1 | * | 3/2003 | Nowka ....................... | 708/209 |
| 6,557,021 B1 | * | 4/2003 | Brooks et al. .............. | 708/496 |
| 6,697,832 B1 | * | 2/2004 | Kelley et al. ............... | 708/501 |

\* cited by examiner

*Primary Examiner*—Kakali Chaki
*Assistant Examiner*—Chat C. Do
(74) *Attorney, Agent, or Firm*—David A. Mims, Jr.

(57) ABSTRACT

A processor for performing a multiply-add instruction on a multiplicand A, a multiplier B, and an addend C, to calculate a result D. The operands are double-precision floating point numbers and the result D is a canonical-form extended-precision floating point number having a high order component and a low order component. The processor is a fused multiply-add processor with a multiplier, an adder, a normalizer and a rounder. The post-adder data path, the normalizer and the rounder each have a data width sufficient to represent post-adder intermediate results to permit the high and low order words of a correctly-rounded result D to be computed. The mantissas of the extended-precision result D are provided such that the high order word mantissa is stored to double precision registers.

15 Claims, 2 Drawing Sheets

PROCESSOR DESIGN FOR EXTENDED-PRECISION ARITHMETIC

FIELD OF THE INVENTION

The present invention is directed to an improvement in computing systems and in particular to a processor for use in executing extended-precision arithmetic.

BACKGROUND OF THE INVENTION

Real numbers may be represented in different ways in computer systems. Standards have been developed for floating point representations, including the commonly used double-precision representation. Standards for arithmetic operations carried out on double-precision numbers have also been developed. For example, the IEEE has defined a standard for double-precision arithmetic in the IEEE 754 Standard (Institute of Electrical and Electronics Engineers, Inc., "IEEE Standard For Binary Floating-Point Arithmetic", Technical Report 754-1985).

Many computers have architectures that implement IEEE double-precision arithmetic in hardware, providing the correctly rounded result for the basic operations of addition, subtraction, multiplication and division (+, −, *, /) In such computers these operations may be carried out for double-precision floating point representations with good performance.

However, double-precision floating point representations are not sufficient for all applications. In particular, where double-precision arithmetic operations are carried out, rounding will frequently occur in calculating a double-precision result. This rounding can occur in calculating intermediate values, as well as in determining the final result. Where intermediate values are rounded, the result of an arithmetic calculation may vary (depending on the rounding that is carried out) or may be unacceptably inaccurate.

An example of an application where the execution of a long series of floating-point computations produces a result which does not match the correct rounding of the mathematical (i.e., infinitely precise) result is the case of vector dot-product. This is discussed in M. Daumas et al. "Validated roundings of dot products by sticky accumulation", IEEE Transactions on Computers, 46(5), pp 623–629. May, 1997. The vector dot-product is a basic operation present in many numerical algorithms, including matrix multiply and many other numerical linear algebra computations.

Computer systems are therefore also designed to support an extended-precision floating point representation for real numbers. By using an extended-precision representation unacceptable results due to rounding can be reduced and in some cases avoided. Typically, however, computer systems supporting the extended-precision floating point representation use software implementations to carry out extended-precision arithmetic. The performance (and sometimes accuracy) of these software implementations can be poor. In these cases the processor carrying out the calculation may be carrying out double-precision operations and it is necessary to use software to ensure that the precision available in extended-precision representations is achieved in the operation being executed. For the vector dot-product example referred to above, Daumas et al describe hardware and software support for computing vector dot-products with a tight error bound, at least in most common cases. Other specialized hardware to implement the multiply-add operation include that described in U.S. Pat. No. 4,969,118 (R. K. Montoye et al., "Floating point unit for calculating A=XY+Z having simultaneous multiply and add"), and R. K. Montoye et al. "Design of the IBM RISC System/6000 floating-point execution unit", IBM Journal of Research & Development, 34(1), pp 59–70, January, 1990. Montoye et al describe a fused multiply-add hardware unit that computes A*B+C as a single atomic operation, producing the correctly rounded mathematical result. The same correctly rounded mathematical results can also be computed with independent multiply and add instruments as described in U.S. Pat. No. 5,880,984 (Mar. 9, 1999, S. M. Burchfiel et al. "Method and apparatus for performing high-precision multiply-add calculations using independent multiply and add instruments"). Other approaches, which compute multiply-add operations as an atomic multiply followed by an atomic add, are referred to in U.S. Pat. No. 5,530,663 (Jun. 25, 1996, L. C. Garcia et al. "Floating point unit for calculating a compound instruction A+B×C in two cycles") and in U.S. Pat. No. 4,841,467 (Jun. 20, 1989, C. -Y. Ho et al. "Architecture to implement floating point multiply/accumulate operations").

The most direct approach to improving the accuracy of numerical algorithms with extensive floating-point computations is to increase the number of bits used to represent the mantissa of floating-point numbers. Instances of floating-point hardware that use extended-(80-bit) and quad-precision (128-bit) representations of floating-point numbers are described in U.S. Pat. No. 5,481,686 (Jan. 2, 1996, K. A. Dockser, "Floating-point processor with apparent-precision based selection of execution-precision"), U.S. Pat. No. 5,631,859 (May 20, 1997, P. Markstein et al. "Floating point arithmetic unit having logic for quad precision arithmetic"), and U.S. Pat. No. RE33,629. (Jul. 2, 1991, J. F. Palmer et al. "Numeric data processor"). However, as discussed in M. Daumas et al. "Validated roundings of dot products by sticky accumulation", IEEE Transactions on Computers, 46(5), pp 623–629. May, 1997, simply increasing the number of bits of the mantissa does not necessarily result in a highly accurate result.

The importance of high-accuracy and exact numerical computations has been recognised, for example in J. H. Bleher et al. "ACRITH: High-accuracy arithmetic, an advanced tool for numerical computation". Proceedings of the 7th Symposium on Computer Arithmetic, pp 318–321, Urbana, Ill., Jun. 4–6, 1985. Bleher et al describe ACRITH, a commercial product for high-accuracy numerical computation. Methods for exact floating-point computation of sums or differences are discussed in W. E. Ferguson, Jr. "Exact computation of a sum or difference with applications to argument reduction." Proceedings of the 12 Symposium on Computer Arithmetic, pp 216–221. Bath, England, Jul. 19–21, 1995. Algorithms for arbitrary precision floating point arithmetic are described in D. M. Priest. "Algorithms for arbitrary precision floating point arithmetic". Proceedings of the 10th Symposium on Computer Arithmetic, pp 132–143. Grenoble, France, Jun. 26–28, 1991.

Although specially designed processors and related software exist to handle extended-precision arithmetic, the cost to redesign existing processors to implement extended precision arithmetic may be prohibitive. It is therefore desirable to have a processor for carrying out extended-precision arithmetic operations that is similar to existing processor designs and which will integrate easily with existing processors but which will permit the implementation of such operations in the processor rather than through software alone.

SUMMARY OF THE INVENTION

According to an aspect of the present invention there is provided an improved processor for use in executing extended-precision arithmetic.

According to another aspect of the invention there is provided a processor for performing a multiply-add instruction on a multiplicand A, a multiplier B, and an addend C, to calculate a result D, each of A, B and C being a double-precision floating point number, the result D being a canonical-form extended-precision floating point number having a high order component and a low order component, each double-precision number and each of the high and low order components of an extended-precision number including an exponent and a mantissa, the processor operating on clock cycles and including a multiplier, an adder, and a normalizer for computing intermediate results in the computation of the multiply-add instruction, a rounder for rounding intermediate results to the result D, a data path in the processor to permit data to flow in sequence from the multiplier to the adder to the normalizer to the rounder, and a set of result registers accepting output from the rounder, for sequentially storing the mantissa of each of the high and low order components of D, the post-adder data path, the normalizer and the rounder each having a data width sufficient to represent post-adder intermediate results whereby both of the high and low order components of the correctly-rounded result D may be computed, and the data path, the multiplier, the adder, the normalizer and the rounder being arranged to permit the respective mantissas of the high order component of D and of the low order component of D to be stored to a selected one of the set of result registers on sequential clock cycles of the processor.

According to another aspect of the invention there is provided the above processor including logic control to determine differential values of the exponents of A, B and C and to carry out operations in the processor, the logic control providing that 1. where the exponent of C is greater than the sum of the exponents of A and B by a predetermined limit, the mantissa of the high order component of result D is computed by taking the mantissa of C, and the mantissa of the low order component of result D is computed by taking the normalized, rounded result of the multiplier having as inputs the mantissas of A and B, 2. where the exponent of C is within the predetermined limit of the sum of the exponents of A and B, the mantissa of the high order component of result D is computed by taking the normalized, rounded result of the multiplier and the adder having as inputs the mantissas of A, B and C, and the mantissa of the low order component of result D is computed by wrapping the low order bits of the result of the normalizer to a first input to the adder, and by supplying a selected one of two predetermined values to a second input to the adder, the selection of the predetermined values being made based on the rounding of the high order component of result D, whereby the low order component of result D is decremented where the high order component is incremented by the rounder, 3. where the exponent of C is less than the sum of the exponents of A and B by the predetermined limit, the mantissa of the high order component of result D is computed by taking the normalized, rounded result of the multiplier and the adder having as inputs the mantissas of A, B and C, and the mantissa of the low order component of result D is computed by wrapping a negative value of high order component of result D to the processor as an addend, and resupplying A and B as multiplicand and multiplier to calculate a remainder value and by further wrapping the remainder and C to the processor to obtain the computed sum of the remainder value and C.

According to another aspect of the invention there is provided a method for computing the mantissa of a canonical form extended-precision number for the result D for the multiply-add instruction A*B+C, where A, B and C are double-precision numbers, the result D being a canonical-form extended-precision floating point number having a high order component and a low order component, each double-precision number and each of the high and low order components of an extended-precision number including an exponent and a mantissa, the method implemented on a computer processor, the processor including an alignment shifter, a multiplier, an adder, an incrementer, and a normalizer for computing intermediate results in the computation of the multiplyadd instruction, a rounder for rounding intermediate results to the result D, a data path in the processor to permit data to flow in sequence from the multiplier to the adder to the normalizer to the rounder, and a set of result registers connected to the rounder, for sequentially storing the mantissa of each of the high and low order components of D, the method including the steps of:

4. shifting the mantissa of C using the alignment shifter, to form a shifted mantissa of C, having a low order portion and a high order portion, the shifting being based on the relative values of the exponents of A, B and C 5. computing partial products of the mantissas of A and B, 6. compressing the low order portion of the shifted mantissa of C with the partial products, 7. adding the compressed low order portion of the shifted mantissa of C and the partial products, using the adder, to generate a carry bit and an add-out value, the add-out value having a binary representation with sufficient bits to represent the added compressed low order portion of the shifted mantissa of C and the partial products, 8. conditionally incrementing the high order portion of the shifted mantissa of C using the incrementer, the increment being based on the carry bit of the adder for the addition of the compressed low order portion of the shifted mantissa of C and the partial products, 9. concatenating the high order word of the shifted mantissa of C with the add-out value, the concatenated binary value representing a pair of words including a dh value representing the high order word of the addition and multiplication result and a pre-dl value representing a preliminary value for the low order word of the addition and multiplication result, 10. normalizing and rounding the concatenated binary value using the normalizer and rounder, 11. providing the normalized and rounded dh value to a selected one of the set of result registers on a high order result clock cycle, 12. determining if the normalized pre-dl value requires modification, modifying the normalized pre-dl value where required, generating a rounded dl value using the normalized pre-dl value, where the dl value is the low order word of the result D, and 13. providing the dl value to a selected one of the set of result registers on a low order clock cycle different from the high order result clock cycle.

According to another aspect of the invention there is provided the above method in which the step of determining if the normalized pre-dl value requires modification includes the step of comparing the relative values of the exponents of A, B and C and where the exponent of C is greater than the sum of the exponents of A and B by a predetermined limit, determining that the normalized predl does not require modification, where the exponent of C is within a predetermined limit of the sum of the exponents of A and B, determining that the normalized pre-dl is to be potentially modified by wrapping the normalized pre-dl value to a first input to the adder, and by supplying a selected one of two predetermined values to a second input to the adder, the selection of the predetermined values being made based on the rounding of dh, whereby the normalized pre-dl is decremented where dh is incremented by the rounder, where the exponent of C is less than the sum of the exponents of A and B by a predetermined limit, the normalized pre-dl is determined to require modification, the modification to be executed by wrapping a negative value of dh to the processor as the addend C, and by inputting the initial A and B values as multiplicand and multiplier to calculate a remainder value equal to A*B−dh, and by further wrapping the remainder and inputting the initial C value to the processor to modify the normalized pre-dl to be the computed sum of the remainder value and C.

According to another aspect of the invention there is provided a fused mutliply-add processor, having improvement for outputting the mantissa of a canonical form extended-precision number for the result D for the multiply-add instruction A*B+C, where A, B and C are double-precision numbers, the result D being a canonical-form extended-precision floating point number having a high order component and a low order component, each double-precision number and each of the high and low order components of an extended-precision number including an exponent and a mantissa, the improvement being characterized by, the post-adder components in the improved fused multiply-add processor for computing intermediate result numbers including a post-adder data path, a normalizer and a rounder, and associated registers, each having a bit-width sufficient to represent the mantissas of the intermediate result numbers so as to permit the computation of the mantissa of the extended-precision result D, and logic control in the improved fused multiply-add processor to provide a high order word mantissa and a low order word mantissa of the extended-precision result D to a selected one of the set of result registers in separate clock cycles.

According to another aspect of the invention there is provided the above improved fused multiply-add processor in which the logic control further provides a wrap back of a low order portion of an intermediate result value to the adder and further supplies a selected predetermined value to the adder to decrement the low order word mantissa of the extended-precision result where the high order word mantissa of the extended-precision result is incremented by the rounder.

According to another aspect of the invention there is provided the improved fused multiply-add processor in which the logic control further provides a wrap back of intermediate values to the input of the fused multiply-add processor to provide for adjustment to the low order word mantissa of the extended-precision result, where the value of the addend for execution of the multiplyadd instruction is truncated during execution of the instruction.

According to another aspect of the invention there is provided an improved fused multiply-add processor for computing the mantissa of a canonical form extended-precision number for the result D for the multiplyadd instruction A*B+C, where A, B and C are double-precision numbers, the result D being a canonical-form extended-precision floating point number having a high order component and a low order component, each double-precision number and each of the high and low order components of an extended-precision number including an exponent and a mantissa, the fused multiply-add processor including an alignment shifter, a multiplier, an adder, an incrementer, and a normalizer for computing intermediate results in the computation of the multiplyadd instruction, a rounder for rounding intermediate results, a data path in the processor to permit data to flow in sequence from the multiplier to the adder to the normalizer to the rounder, and a set of result registers taking the results of the rounder as input, the improvement being characterized by the post-adder data path, the normalizer and the rounder each having a data width sufficient to represent post-adder intermediate results whereby both of the high and low order components of the correctly-rounded result D may be computed, logic control for the improved fused multiply-add processor to carry out the following steps:

shifting the mantissa of C using the alignment shifter, to form a shifted mantissa of C, having a low order portion and a high order portion, the shifting being based on the relative values of the exponents of A, B and C computing partial products of the mantissas of A and B, compressing the low order portion of the shifted mantissa of C with the partial products, adding the compressed low order portion of the shifted mantissa of C and the partial products, using the adder, to generate a carry bit and an add-out value, the add-out value having a binary representation with sufficient bits to represent the added compressed low order portion of the shifted mantissa of C and the partial products, conditionally incrementing the high order portion of the shifted mantissa of C using the incrementer, the increment being based on the carry bit of the adder for the addition of the compressed low order portion of the shifted mantissa of C and the partial products, concatenating the high order word of the shifted mantissa of C with the add-out value, the concatenated binary value representing a pair of words including a dh value representing the high order word of the addition and multiplication result and a pre-dl value representing a preliminary value for the low order word of the addition and multiplication result, normalizing and rounding the concatenated binary value using the normalizer and rounder, providing the normalized and rounded dh value to a selected one of the set of result registers on a high order result clock cycle, determining if the normalized pre-dl value requires modification, modifying the normalized pre-dl value where required, generating a rounded dl value using the normalized pre-dl value, where the dl value is the low order word of the result D, and providing the dl value to a selected one of the set of result registers on a low order clock cycle different from the high order result clock cycle.

According to another aspect of the invention there is provided the above improved fused multiply-add processor in which the control logic for carrying out the step of determining if the normalized pre-dl value requires modification includes the step of comparing the relative values of the exponents of A, B and C and where the exponent of C is greater than the sum of the exponents of A and B by a predetermined limit, determining that the normalized predl does not require modification, where the exponent of C is within a predetermined limit of the sum of the exponents of A and B, determining that the normalized pre-dl is to be potentially modified by wrapping the normalized pre-dl value to a first input to the adder, and by supplying a selected one of two predetermined values to a second input to the adder, the selection of the predetermined values being made based on the rounding of dh, whereby the normalized pre-dl is decremented where dh is incremented by the rounder, where the exponent of C is less than the sum of the exponents of A and B by a predetermined limit, the normalized pre-dl is determined to require modification, the modification to be executed by wrapping a negative value of dh to the processor as the addend C, and by inputting the initial A and B values as multiplicand and multiplier to calculate a remainder value equal to A*B–dh, and by further wrapping the remainder and inputting the initial C value to the processor to modify the normalized pre-dl to be the computed sum of the remainder value and C.

Advantages of the present invention include a processor that is similar to existing processor architectures for double-precision arithmetic but which may efficiently carry out accurate extended-precision arithmetic. The implementation of the present invention permits arithmetic operations to be carried out consistently across different machine platforms. In particular, the design of the many machines currently implementing a double-precision fused-multiply-add (FMA) instruction may be modified to implement the extended-precision instruction of the preferred embodiment.

DETAILED DESCRIPTION OF THE PREFERRED EMBODIMENT

The processor of the preferred embodiment is used to carry out a space- and time-efficient technique for performing floating-point arithmetic operations using an extended-precision numerical representation. The processor and the technique used on the processor use a canonical representation having multiple double-precision fields to represent an extended-precision floating-point number. The preferred embodiment computes an extended-precision number (ch, cl) which is the unevaluated sum of two double-precision numbers ch and cl whose fraction bits (mantissas) do not overlap. The extended-precision number (ch,cl) is defined such that the value of the extended-precision number is equal to the exact (i.e., performed with real arithmetic) sum of the two double precision numbers ch and cl. For each (ch,cl), the result of the IEEE arithmetic sum fl(ch+cl) is identically equal to ch. In other words, the absolute value of cl is too small to make a difference when added to ch according to the rules of IEEE arithmetic. This may be expressed:

(ch, cl)=ch+cl, where fl(ch+cl)=ch.

This representation is known in the art. The canonical representation (ch,cl) for extended-precision floating point numbers is used by the IBM XLF Fortran compiler ("XL Fortran for AIX Language Reference Version 7, Release 1", SC09-2867-00, IBM Corp., 1999).

The description of the preferred embodiment describes the preferred embodiment as a processor carrying out a machine instruction. It will be understood by those skilled in the art that the processor described may be a sub-unit of a larger processor. For example, the preferred embodiment may be implemented as an arithmetic unit, or a part of an arithmetic unit, in a larger general purpose processor. The description of the preferred embodiment sets out the details of the processor as they relate to the calculation of the mantissas of high and low components (or words) of an extended precision result of a fused multiply-add operation. There are other aspects of the computation, including manipulation of exponents and processing relating to the sign of the operands and results, which are not set out in this description but which are known to those skilled in the art relating to processors (*Computer Arithmetic: Principles, Architecture, and Design*, Kai Hwang, John Wiley and Sons, 1979).

In addition, the description below refers to double-precision IEEE numbers. It will be understood by those skilled in the art that the invention described may also be implemented with respect to a processor having a similar architecture but accepting inputs with different bit-lengths for exponent and mantissa. The invention may also be implemented where the inputs are originally single-precision numbers but the single-precision numbers are modified to be represented in the processor as double precision numbers. A single-precision number is a number represented with a shorter exponent and mantissa than the IEEE standard for double-precision numbers.

Figure 1:
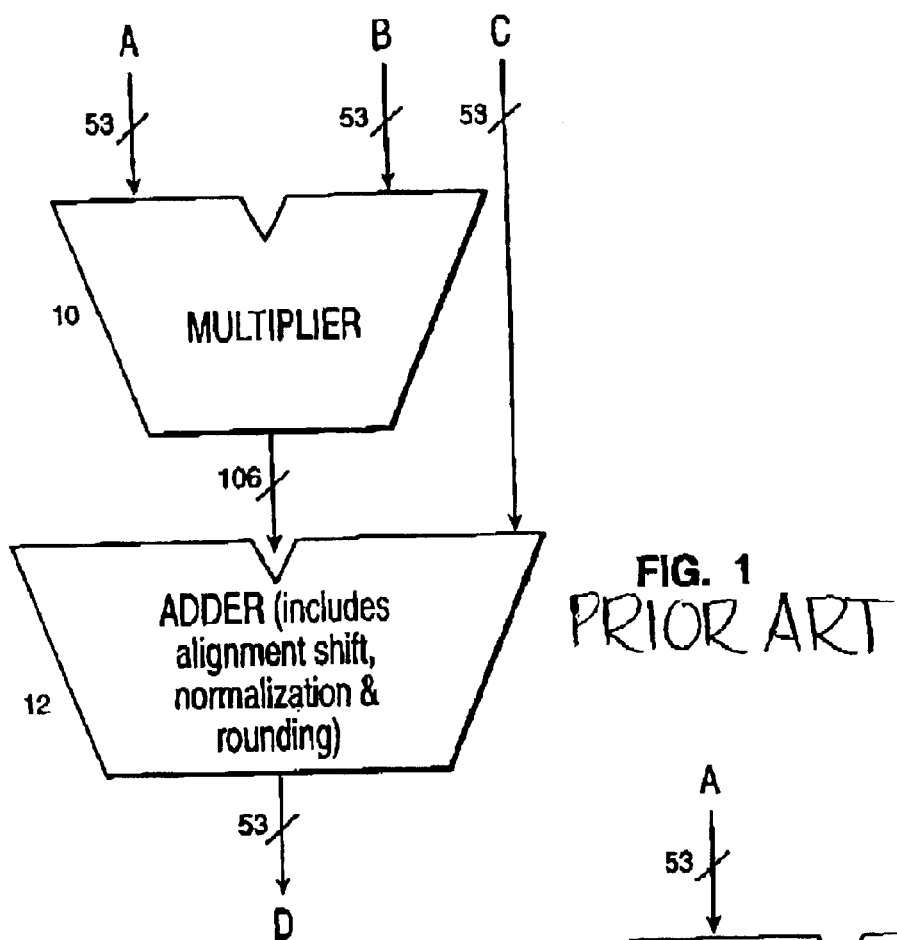
FIG. 1 illustrates, in a block diagram format, the high level architecture of a processor of the prior art.

In the prior art, processors have been developed to support a fused multiply-add operation (referred to as FMA processors). An example of such an FMA processor is found in the IBM RS/6000™ computer. Other processors include a similar architecture. FIG. 1 shows a high level description of the architecture in this prior art FMA processor.

FMA processors implement a fused multiply-add (FMA) instruction that computes the floating-point number d=fl(a*b+c), where a, b, c, and d are double-precision numbers, and fl(x) is the correctly rounded double-precision number corresponding to the real number x. The implementation of this instruction requires computing a*b exactly, adding that intermediate result to c, and then performing a rounding to generate a double-precision result.

FIG. 1 shows the high level architecture comprising multiplier 10 with two 53-bit inputs representing the mantissa portions of double-precision numbers a and b. Adder 12 is also shown in FIG. 1 and has as inputs the 106-bit output of multiplier 10 and the 53-bit mantissa of c. The output of the FMA is the mantissa of the number d, shown as a 53 bit value in FIG. 1. The 106-bit result of multiplier 10 is capable of representing an exact product of the double-precision inputs. The output of adder 12 is a rounded value having 53-bits of the mantissa of the double-precision result d.

The exponent component of the a*b+c calculation is calculated in a portion of the processor not shown in the Figures but understood by those skilled in the art. The exponent calculation and processing will not be referred to in this description other than when the exponent values are used in determining the mantissa (or fraction) values for the numbers being computed.

Figure 2:
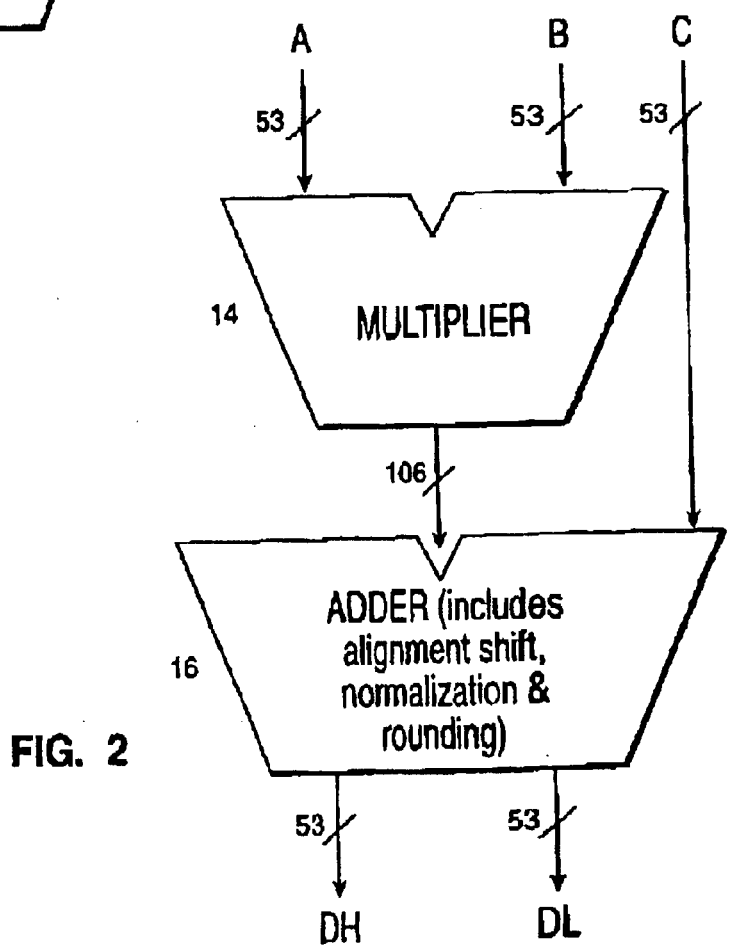
FIG. 2 illustrates, in a block diagram format, the high level architecture of the processor of the preferred embodiment.

The architecture of the processor of the preferred embodiment is shown in the high level block diagram in FIG. 2. The processor of FIG. 2 executes a machine instruction, the extended fused multiply-add (XFMA) instruction, that computes $$(dh,dl)=ext(a*b+c),$$

where a, b, and c are double-precision floating-point numbers, (dh,dl) is an extended-precision floating-point number, and ext(x) is the correctly rounded extended-precision number corresponding to the real number x.

Because the result of the XFMA operation is an extended-precision representation in canonical form, the value dh is the equivalent of the IEEE floating point double-precision result for the computation of a*b+c.

The input values for the processor of FIG. 2 are all double-precision numbers and therefore each have a 53-bit mantissa component. Multiplier 14 is shown with inputs for numbers a and b. Adder 16 in FIG. 2 has the 106-bit result from multiplier 14, and the 53-bit mantissa of c as inputs. The output of adder 16 is a pair of 53-bit values representing the two mantissas of an extended-precision representation of d.

Modifying hardware that implements the FMA instruction (shown in at a high level in FIG. 1) to provide the XFMA instruction requires exposing more bits of the result values in the computation. As indicated above, the multiplication circuitry for FMA (multiplier 10) computes the a*b term as a 106-bit value. As a consequence, modifications to the processor architecture to provide an extended-precision floating point result are made in the adder portion of the processor. This is demonstrated in FIGS. 1 and 2. The change to the processor architecture is therefore only made to the output section of the adder. The logic control of the preferred embodiment processor differs from the prior art in a manner set out below.

Figure 3:
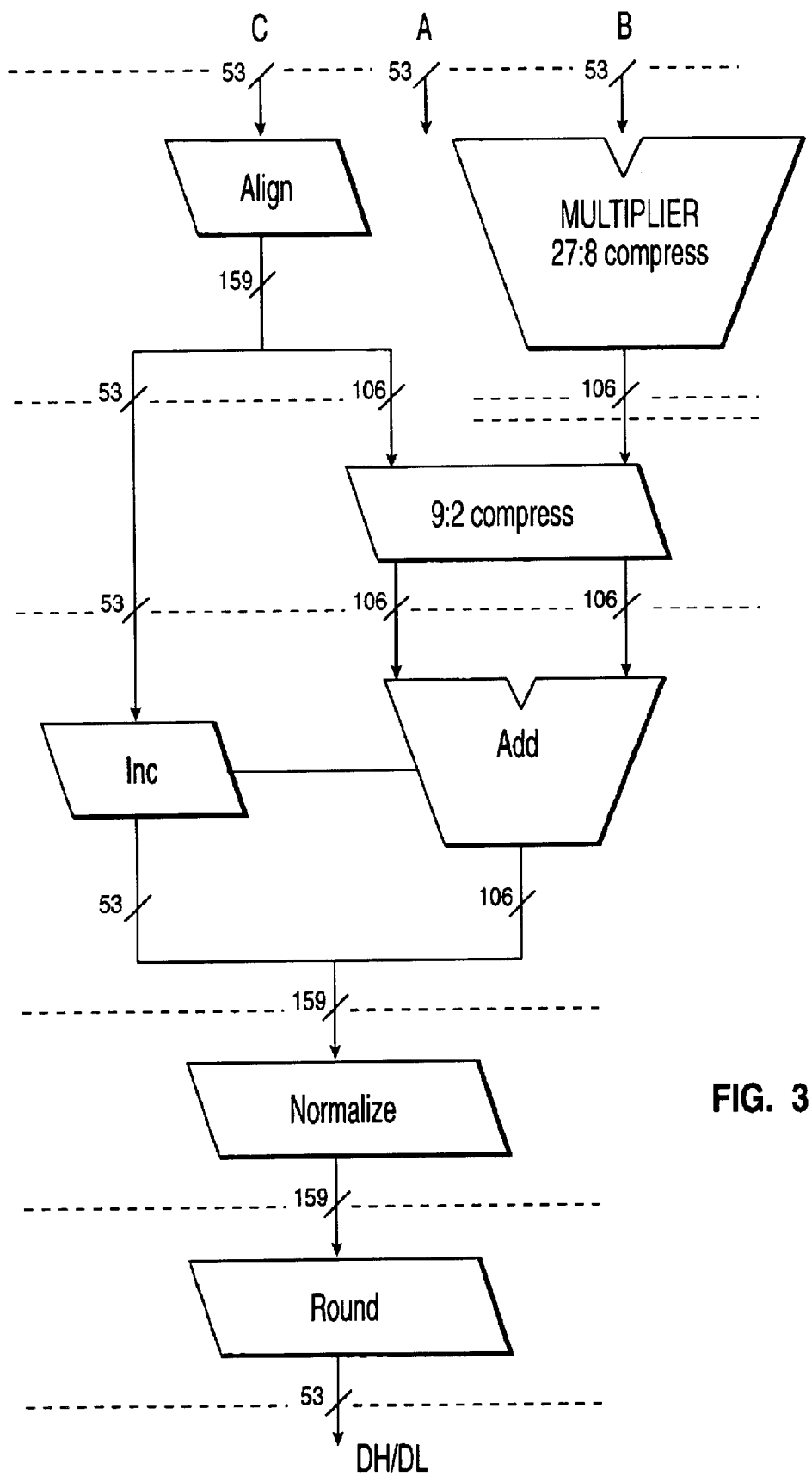
FIG. 3 illustrates, in a block diagram format, the detailed architecture of the processor of the preferred embodiment.

The details of the processor of the preferred embodiment are shown with reference to FIG. 3. The processor of the preferred embodiment takes as input the mantissa (or fraction) bits of the three double-precision numbers a, b, c. The mantissa of a is stored in register 22, that of b in register 24 and that of c in register 20. The output of the processor is stored in result register 26. In the figure, a single result register 26 is shown. The processor may include one or more result registers in a set of result registers. The preferred embodiment includes two result registers, shown schematically in the figure as single result register 26. The processor of the preferred embodiment has a data path to each of the result registers in the set of result registers. The width of the data path is able to handle a double precision mantissa and not an extended precision mantissa. The output is provided sequentially such that the high order double-precision word of an extended-precision number in canonical form is stored in register 26 and the low order word is also stored in register 26, but on a different clock cycle.

Input registers 22, 24 are inputs for multiplier 30, which is the first part of a two part multiplier. The second part is shown in FIG. 3 as 9:2 compressor 32. In the preferred embodiment, multiplier 30 takes the two 53-bit inputs and obtains partial products based on base 4 representations of the inputs. There are 27 partial products produced by this multiply step. There is a 27:8 compression step that follows in multiplier 30 (sets of three of the base 4 partial products are summed).

Input register 20 is an input to alignment shifter 28. Alignment shifter 28 carries out a shift of the 53 bits from register 20, based on the exponent values of each of a, b and c. The shift amount is calculated to be 53 plus the sum of the exponents of a and b, less the exponent of c, or zero, whichever is greater. The result of alignment shifter 28 is provided, in two parts, the high order bits of the results being stored to alignment high register 34 and the low order bits of the result being stored to alignment low register 36.

The output of multiplier 30 is a set of 8 70-bit values corresponding to the partial products compressed to eight values, as described above. The overall width of the 8 sets of 70-bit values, when the sets are arranged in alignment, is 106 bits. This set of 8 70-bit registers is input, along with the 106-bit alignment low register 36, to 9:2 compressor 32 (the second part of the multiplier component of the processor).

Alignment high register 34 provides the input for high sum register 40. Similarly, 106-bit sum register 41 and 106-bit carry register 42 each receive output from 9:2 compressor 32 and provide input for adder 44. Adder 44 has a logical connection to incrementer 46 used to increment the high sum register 40 value, if adder 44 indicates a carry into the high sum portion of the result number. The results from adder 44 and from incrementer 46 are stored in add-out register 52. This register concatenates the high 53 bits from the incrementer 46 and the lower 106 bits from the adder 44.

Add-out register 52 provides input for normalizer 54. The output from normalizer 54 is stored to norm-out register 56 which in turn provides input for rounder 58. The output of rounder 58 is maintained in result register 26.

The execution of the a*b+c operation on the processor according to the preferred embodiment differs depending on the relative exponent values of a, b and c. The number c is shifted in alignment shifter 28, depending on these relative exponent values. The alignment of c results in three different cases being possible for the processor. In the preferred embodiment control logic is incorporated in the processor to determine data flow and computation execution, based on which of the three cases is presented to the processor.

The first case is where there is no alignment shift for c in alignment shifter 28. This occurs where exp_a+exp_b<exp_c−53 (where exp_a, exp_b and exp_c are exponents for a, b, c respectively). In this case, the value of dh in (dh, dl) is simply the value of c. This occurs when the absolute value of c is much larger than the absolute value of a * b. Where this is the case, the value of c effectively passes through the processor unmodified to be represented in the high order word dh of the output at result register 26. The value of a*b is calculated and is sequentially made available as the low order word dl in register 26. As indicated above, the preferred embodiment includes two result registers, shown schematically in the figure as result register 26.

The second case is where the shift to be applied to c is in the range 0 . . . 106, inclusive. In this case, the 159-bit value that will be stored to add-out register 52 is the exact representation of a*b+c. The mantissa of the high order word of the result (dh) available from the rounded value of the output from normalizer 54. The low order word of the result (dl) is calculated by wrapping around bits 53 to 158 of norm-out register 56, to carry register 42. The dh value may represent an incremented value when rounder 58 rounds up the dh value presented to it. When this is the case, the lower word portion of norm-out register 56 (bits 53:158) becomes input for carry register 42, while the binary negative value for 106-bits having a leading 1 is input to sum register 41. The low order word, of the canonical form extended-precision result is therefore adjusted to account for the rounding up that occurred in the high order word. The requirement (dh, dl)=dh+dl where dh=fl(dh+dl) is therefore maintained. Where there is no upward rounding carried out on the high order word (dh), the value supplied to sum register 41 is 0. The wrap back of the low order word from norm-out register 56 permits the low order word of the result to be provided to result register 26 at a later clock cycle than the high order word.

The third case is when the absolute value of c is much smaller than the absolute value of a*b and therefore the shift applied to c is greater than 106. In this case, the processor takes three passes to calculate the (dh, dl) pair. The second and third passes take as input the calculated values from the previous pass. The first pass will generate the value of dh in the manner described above. A negative dh value is then wrapped to register 20, and values A and B are stored again to registers 22, 24, respectively. The processor then calculates a remainder value corresponding to A*B−dh. This value is exactly representable as a double-precision number stored to result register 26. The remainder and C are then input to the processor such that their sum is calculated. The rounded value of this sum is then supplied to result register 26, as dl.

The first two of the three cases are set out in more detail below with reference to the following cycle-by-cycle sequencing tables. The table is set up so that the leftmost column indicates the register in the processor into which a calculated value is to be stored. For example normreg'←Norm(addreg)

is used to denote that the normreg register on the next clock cycle will have a value of the output of the normalizer operating on the current value of addreg. The notation used in the tables includes the following abbreviations:

A',B',C' (registers 22, 24, 20), alignreg' (align registers 34, 36), multreg' (multiplier registers 38), hi sum' (high sum register 40), sum', (sum register 41), carry' (carry register 42), addreg' (add-out register 52), normreg' (norm-out register 56), result reg' (result register 26), align( ) (alignment shifter 28), mult1( ) (multiplier 30), mult2( ) (9:2 compressor 32), norm( ) (normalizer 54), and round( ) (rounder 58).

The top row of each table indicates the clock cycle for the operation of the processor, beginning with a time of t=X.

TABLE 1

| | t = X | t = X + 1 | t = X + 2 | t = X + 3 | t = X + 4 | t = X + 5 | t = X + 6 |
|---|---|---|---|---|---|---|---|
| | | | | (aligncase = 1) | | | |
| A', B', C' <- | operands | hold | new operands | | | | |
| alignreg' <- | | align (C) | 0 | next instruction | | | |
| multregs <- | | mult1 (A, B) | mult1 (A, B) | next instruction | | | |
| hi sum' <- | | | align hi = C | 0 | next instruction | | |
| sum', carry'<- | | | | 0 | mult2 () | next instruction | |
| addreg' <- | | | | | c | a * b | next instruction |
| normreg' <- | | | | | | c | a * b | next instruction |
| result reg' <- | | | | | | | dh = c | dl = round (a * b) |

TABLE 2

| | t = X + 2 | t = X + 3 | t = X + 4 | t = X + 5 | t = X + 6 | t = X + 7 | t = X + 8 |
|---|---|---|---|---|---|---|---|
| | | | | (aligncase = 2) | | | |
| A', B', C' <- | 0 | 0 | new operands | | | | |
| alignreg' <- | 0 | 0 | 0 | next instruction | | | |
| multregs' <- | mult1 (A, B) | 0 | 0 | next instruction | | | |
| hi sum' <- | align hi 0 | 0 | 0 | next instruction | | | |
| sum' <- | mult2 (sum) | 0 | 0 | f (round) next instruction | | | |
| carry' <- | mult2 (cyn) | 0 | 0 | norm(53:158) | next instruction | | |
| addreg' <- | | a * b+ c exact | 0 | 0 | ab + c − dh | | |
| normreg' <- | | | norm(ab + c) | a * b | | norm (addreg) | |
| results reg' <- | | | | dh = round (ab + c) | | | dl = round (normreg) |

As may be seen from the above description, the calculation of the high order word of the extended-precision representation of the result of the computation d=a*b+c is carried out in a manner similar to the FMA processor of the prior art. The calculation of the low order word of the result is achieved using wider add out register 52, normalizer 54, norm-out register 56 and rounder 58 and using the different operations set out above for the three possible cases. In the first case, where c is much larger that a*b, the low order word (dl) is calculated as a*b, using the multiplier in the processor of the preferred embodiment. In the second case, where c and a*b have similar magnitudes, the value of the low order word (dl) is adjusted based on the rounding carried out on the high order word (dh). In the third case, the value of c is much smaller than a*b and as a result the low order word of the result (dh) is calculated using the product a*b and the higher order word (dh). In each of these cases, the architecture of the preferred embodiment processor is used to calculate the two double-precision words of the extended-precision result in a sequential manner.

The preferred embodiment processor and machine instruction results in dh being made available to result register 26 and then the dl representation being made available in a later cycle. This permits the computation of an extended-precision result for double-precision input values for the d=a*b+c operation. The computation results in a value stored to a register having the same size as the register used for the FMA calculation of the prior art. For this reason the XFMA is able to be used in processor environments the same as or similar to environments designed to include FMA processing.

The processor and machine instruction of the preferred embodiment described above may be used to calculate extended-precision numbers that represent the exact result for each of the four basic arithmetic operations and square root. The steps to carry out these operations are less complex than alternative algorithms that use the IEEE operations (fl(a+b), fl(a−b), fl(a*b), fl(a/b), dsqrt(a/b)) and the standard FMA instruction. The steps to calculate these arithmetic operations may be included in the processor itself, or may be implemented in software. As will be seen, the software implementation requires less code and is more efficient than prior art software approaches to calculating an extended-precision representation of the result.

Where a and b are double-precision floating-point numbers, the processor and machine instruction of the preferred embodiment computes (ch,cl)=a op b, where op is one of +, −, *, /, sqrt( ), using IEEE operations and XFMAs as follows (one and zero represent double precision 1and double precision 0, respectively):

a+b is computed as (ch,cl)=one*a+b.

a−b is computed as (ch,cl)=−one*b+a.

a*b is computed as (ch,cl)=a*b+zero.

a/b is computed in two steps: First q=fl(a/b) is computed using the IEEE divide operator. Then (dh,dl)=−b*q+a is computed. In this case dl is always 0 and we can define the exact result as (ch,cl)=(q,dh). In this case, ch+cl is not meant to be equal to the exact value of a/b. In fact, a/b may not be representable with a finite number of bits. Instead, the equality that holds is a=b*ch+cl. Note, however, that fl (ch+cl)=ch, as required in the canonical representation.

sqrt(a) is computed in two steps: First x=dsqrt(a) is computed using the IEEE square root function. Then (dh,dl)=x*x−a is computed. In this case dl is always 0 and we can define the exact result as (ch, cl)=(x,dh). In this case, ch+cl is not meant to be equal to the exact value of sqrt(a). In fact, sqrt(a) is usually irrational and therefore requires an infinite number of bits. Instead, the equality that holds is a=ch*ch−cl. Note, however, that fl (ch+cl)=ch, as required in the canonical representation.

The above approach permits the processor of the preferred embodiment to produce a result to represent the exact values of a+b, a−b, a*b, and a/b. The basis for the technique is the fact that IEEE 754 double-precision floating-point numbers represent a large but finite set of rational numbers. It is true that any given IEEE floating-point number can be transformed into an integer by scaling it by a power of 2. It is also true that given any two integers a and b there exist two integers q and r such that a=q*b+r.

This fundamental relation is relied on in the definition of all four basic arithmetic operations for the processor of the preferred embodiment, as set out above. If the above relation is evaluated in the space of integer numbers then it will be possible to compute exact results. This is also possible in the space of IEEE floating-point numbers, with one exception. The technique will not yield a correct result when the result overflows or underflows the range of numbers that can be represented by IEEE floating-point format. Thus there is a limitation associated with the preferred embodiment, as described above, that is related to the limitations imposed by the range of IEEE floating point numbers. In the preferred embodiment the limitation is handled by producing an IEEE exception value as the result.

Because the real value of d=a*b+c can extend over more than 159 bits, it may not have an exact representation in canonical extended precision. In that case, the result d is rounded to the closest extended-precision number.

As the above indicates, by using the processor and machine instruction of the preferred embodiment, correctly-rounded extended-precision results may be obtained for all non-exceptional cases of the five basic operations in floating point arithmetic with double-precision operands (and may also be used to obtain results for single-precision operands input into the processor as double-precision numbers). The processor and machine instruction of the preferred embodiment require only a small change to the prior art processor architecture, and are without the performance penalty of software implementations.

In the preferred embodiment, latency is typically only 3 cycles greater than for the current double-precision FMA. Only minor additions to the hardware are needed. The dataflow logic for the preferred embodiment requires the addition of extra bits in a limited number of registers and in the post-normalize shifter, and an additional input to a wrap path (back into sum register 41; potentially implemented on a relaxed, full-cycle register-register path). At the same time, the multiplexer providing input to add-out register 52 is simplified.

Although a preferred embodiment of the present invention has been described here in detail, it will be appreciated by those skilled in the art that variations may be made thereto without departing from the spirit of the invention or the scope of the appended claims.

The embodiments of the invention in which an exclusive property or privilege are claimed are defined as follows:

1. A processor for performing a multiply-add instruction on a multiplicand A, a multiplier B, and an addend C, to calculate a result D, each of A, B and C being a double-precision floating point number, the result D being a canonical-form extended-precision floating point number having a high order component and a low order component, each double-precision number and each of the high and low order components of an extended-precision number comprising an exponent and a mantissa, the processor operating on clock cycles and comprising
a multiplier, an adder, and a normalizer for computing intermediate results in the computation of the multiply-add instruction,
a rounder for rounding intermediate results to the result D,
a data path in the processor to permit data to flow in sequence from the multiplier
to the adder to the normalizer to the rounder, and
a set of result registers accepting output from the rounder, for sequentially storing the mantissa of each of the high and low order components of D, the post-adder data path, the normalizer and the rounder each having a data width sufficient to represent post-adder intermediate results whereby both of the high and low order components of the correctly-rounded result D may be computed, and the data path, the multiplier, the adder, the normalizer and the rounder being arranged to permit the respective mantissas of the high order component of D and of the low order component of D to be stored to the set of result registers on sequential clock cycles of the processor, and where the processor logic control determines differential values of the exponents of A, B and C and to carry out operations in the processor, the logic control providing that a. where the exponent of C is greater than the sum of the exponents of A and B by a predetermined limit,
the mantissa of the high order component of result D is computed by taking the mantissa of C, and
the mantissa of the low order component of result D is computed by taking the normalized, rounded result of the multiplier having as inputs the mantissas of A and B, b. where the exponent of C is within the predetermined limit of the sum of the exponents of A and B,
the mantissa of the high order component of result D is computed by taking the normalized, rounded result of the multiplier and the adder having as inputs the mantissas of A, B and C, and
the mantissa of the low order component of result D is computed by wrapping the low order bits of the result of the normalizer to a first input to the adder, and by supplying a selected one of two predetermined values to a second input to the adder, the selection of the predetermined values being made based on the rounding of the high order component of result D, whereby the low order component of result D is decremented where the high order component is incremented by the rounder, c. where the exponent of C is less than the sum of the exponents of A and B by the predetermined limit,
the mantissa of the high order component of result D is computed by taking the normalized, rounded result of the multiplier and the adder having as inputs the mantissas of A, B and C, and
the mantissa of the low order component of result D is computed by wrapping a negative value of high order component of result D to the processor as an addend, and resupplying A and B as multiplicand and multiplier to calculate a remainder value and by further wrapping the remainder and C to the processor to obtain the computed sum of the remainder value and C.

2. The processor of claim 1 in which the predetermined limit is equal to the length of the mantissas of the double-precision and the extended-precision numbers.

3. The processor of claim 2 in which the length of the mantissas of the double-precision and the extended-precision numbers is 53 bits and in which the predetermined limit is 53.

4. The processor of claim 2 in which the step of determining if the pre-dl requires modification comprises the step of comparing the relative values of the exponents of A, B and C.

5. The processor of claim 4 in which the comparison of relative values of the exponents of A, B and C comprises the step of determining whether the exponent of C is greater than, less than, or within a predetermined limit of the sum of the exponents of A and B.

6. The processor of claim 5 in which the predetermined limit is equal to the length of the mantissas of the double-precision and the extended-precision numbers.

7. The processor of claim 6 in which the length of the mantissas of the double-precision and the extended-precision numbers is 53 bits and in which the predetermined limit is 53.

8. The processor of claim 2 in which the step of determining if the normalized pre-dl value requires modification comprises the step of comparing the relative values of the exponents of A, B and C and a. where the exponent of C is greater than the sum of the exponents of A and B by a predetermined limit, determining that the normalized pre-dl does not require modification, b. where the exponent of C is within a predetermined limit of the sum of the exponents of A and B,
determining that the normalized pre-dl is to be potentially modified by wrapping the normalized pre-dl value to a first input to the adder, and by supplying a selected one of two predetermined values to a second input to the adder, the selection of the predetermined values being made based on the rounding of dh, whereby the normalized pre-dl is decremented where dh is incremented by the rounder, c. where the exponent of C is less than the sum of the exponents of A and B by a predetermined limit,
the normalized pre-dl is determined to require modification, the modification to be executed by wrapping a negative value of dh to the processor as the addend C, and by inputting the initial A and B values as multiplicand and multiplier to calculate a remainder value equal to A*B−dh, and by further wrapping the remainder and inputting the initial C value to the processor to modify the normalized pre-dl to be the computed sum of the remainder value and C.

9. A method for computing the mantissa of a canonical form extended-precision number for the result D for the multiply-add instruction A*B+C, where A, B and C are double-precision numbers, the result D being a canonical-form extended-precision floating point number having a high order component and a low order component, each double-precision number and each of the high and low order components of an extended-precision number comprising an exponent and a mantissa, the method implemented on a computer processor, the processor comprising an alignment shifter, a multiplier, an adder, an incrementer, and a normalizer for computing intermediate results in the computation of the multiply-add instruction, a rounder for rounding intermediate results to the result D, a data path in the processor to permit data to flow in sequence from the multiplier to the adder to the normalizer to the rounder, and a set of result registers connected to the rounder, for sequentially storing the mantissa of each of the high and low order components of D, the method comprising the steps of:

a. shifting the mantissa of C using the alignment shifter, to form a shifted mantissa of C, having a low order portion and a high order portion, the shifting being based on the relative values of the exponents of A, B and C b. computing partial products of the mantissas of A and B, c. compressing the low order portion of the shifted mantissa of C with the partial products, d. adding the compressed low order portion of the shifted mantissa of C and the partial products, using the adder, to generate a carry bit and an add-out value, the add-out value having a binary representation with sufficient bits to represent the added compressed low order portion of the shifted mantissa of C and the partial products, e. conditionally incrementing the high order portion of the shifted mantissa of C using the incrementer, the increment being based on the carry bit of the adder for the addition of the compressed low order portion of the shifted mantissa of C and the partial products, f. concatenating the high order word of the shifted mantissa of C with the add-out value, the concatenated binary value representing a pair of words comprising a dh value representing the high order word of the addition end multiplication result and a pre-dl value representing a preliminary value for the low order word of the addition and multiplication result, g. normalizing and rounding the concatenated binary value using the normalizer and rounder, h. providing the normalized and rounded dh value to a selected one of the set of result registers on a high order result clock cycle, i. determining if the normalized pre-dl value requires modification, modifying the normalized pre-dl value where required, generating a rounded dl value using the normalized pre-dl value, where the dl value is the low order word of the result D, and j. providing the dl value to a selected one of the set of result registers on a low order clock cycle different from the high order result clock cycle.

10. In a fused mutliply-add processor, an improvement for outputting the mantissa of a canonical form extended-precision number for the result D for the multiply-add instruction A*B+C, where A, B and C are double-precision numbers, the result D being a canonical-form extended-precision floating point number having a high order component and a low order component, each double precision number and each of the high and low order components of an extended-precision number comprising an exponent and a mantissa, the improvement being characterized by, the post-adder components in the improved fused multiply-add processor for computing intermediate result numbers comprising a post-adder data path, a normalizer and a rounder, and associated registers, each having a bit-width sufficient to represent the mantissas of the intermediate result numbers so as to permit the computation of the mantissa of the extended-precision result D, and logic control in the improved fused multiply-add processor to provide a high order word mantissa and a low order word mantissa of the extended-precision result D to a set of result registers in separate clock cycles, and where the fused multiply-add processor logic control further provides a wrap back of a low order portion of an intermediate result value to the adder and further supplies a selected predetermined value to the adder to decrement the low order word mantissa of the extended-precision result where the high order word mantissa of the extended-precision result is incremented by the rounder.

11. The improved fused multiply-add processor of claim 10 in which the logic control further provides a wrap back of intermediate values to the input of the fused multiply-add processor to provide for adjustment to the low order word mantissa of the extended-precision result, where the value of the addend for execution of the multiply-add instruction is truncated during execution of the instruction.

12. An improved fused multiply-add processor for computing the mantissa of a canonical form extended-precision number for the result D for the multiply-add instruction A*B+C, where A, B and C are double-precision numbers, the result D being a canonical-form extended-precision floating point number having a high order component and a low order component, each double-precision number and each of the high and low order components of an extended-precision number comprising an exponent and a mantissa, the fused multiply-add processor comprising an alignment shifter, a multiplier, an adder, an incrementer, and a normalizer for computing intermediate results in the computation of the multiply-add instruction, a rounder for rounding intermediate results, a data path in the processor to permit data to flow in sequence from the multiplier to the adder to the normalizer to the rounder, and a set of result registers taking the results of the rounder as input, the improvement being characterized by a. the post-adder data path, the normalizer and the rounder each having a data width sufficient to represent post-adder intermediate results whereby both of the high and low order components of the correctly-rounded result D may be computed, b. logic control for the improved fused multiply-add processor to carry out the following steps:

i. shifting the mantissa of C using the alignment shifter, to form a shifted mantissa of C, having a low order portion and a high order portion, the shifting being based on the relative values of the exponents of A, B and C ii. computing partial products of the mantissas of A and B, iii. compressing the low order portion of the shifted mantissa of C with the partial products, iv. adding the compressed low order portion of the shifted mantissa of C and the partial products, using the adder, to generate a carry bit and an add-out value, the add-out value having a binary representation with sufficient bits to represent the added compressed low order portion of the shifted mantissa of C and the partial products, v. conditionally incrementing the high order portion of the shifted mantissa of C using the incrementer, the increment being based on the carry bit of the adder for the addition of the compressed low order portion of the shifted mantissa of C and the partial products, vi. concatenating the high order word of the shifted mantissa of C with the add-out value, the concatenated binary value representing a pair of words comprising a dh value representing the high order word of the addition and multiplication result and a pre-dl value representing a preliminary value for the low order word of the addition and multiplication result, vii. normalizing and rounding the concatenated binary value using the normalizer and rounder, viii. providing the normalized and rounded dh value to one of the set of result registers on a high order result clock cycle, ix. determining if the normalized pre-dl value requires modification, modifying the normalized pre-dl value where required, generating a rounded dl value using the normalized pre-dl value, where the dl value is the low order word of the result D, and x. providing the dl value to a selected one of the set of result registers on a low order clock cycle different from the high order result clock cycle.

13. The improved fused multiply-add processor of claim 12 in which the control logic for carrying out the step of determining if the normalized pre-dl value requires modification comprises the step of comparing the relative values of the exponents of A, B and C and a. where the exponent of C is greater than the sum of the exponents of A and B by a predetermined limit, determining that the normalized pre-dl does not require modification, b. where the exponent of C is within a predetermined limit of the sum of the exponents of A and B, determining that the normalized pre-dl is to be potentially modified by wrapping the normalized pre-dl value to a first input to the adder, and by supplying a selected one of two predetermined values to a second input to the adder, the selection of the predetermined values being made based on the rounding of dh, whereby the normalized pre-dl is decremented where dh is incremented by the rounder, c. where the exponent of C is less than the sum of the exponents of A and B by a predetermined limit, the normalized pre-dl is determined to require modification, the modification to be executed by wrapping a negative value of dh to the processor as the addend C, and by inputting the initial A and B values as multiplicand and multiplier to calculate a remainder value equal to A*B−dh, and by further wrapping the remainder and inputting the initial C value to the processor to modify the normalized pre-dl to be the computed sum of the remainder value and C.

14. The improved fused multiply-add processor of claim 13 which the predetermined limit is equal to the length of the mantissas of the double-precision and the extended-precision numbers.

15. The improved fused multiply-add processor of claim 13 in which the length of the mantissas of the double-precision and the extended-precision numbers is 53 bits and in which the predetermined limit is 53.

* * * * *